July 30, 1929.  M. PRÜSS  1,722,945
METHOD OF ACCELERATING THE SLUDGE DIGESTION FOR SEWAGE TREATMENT
Filed June 18, 1927
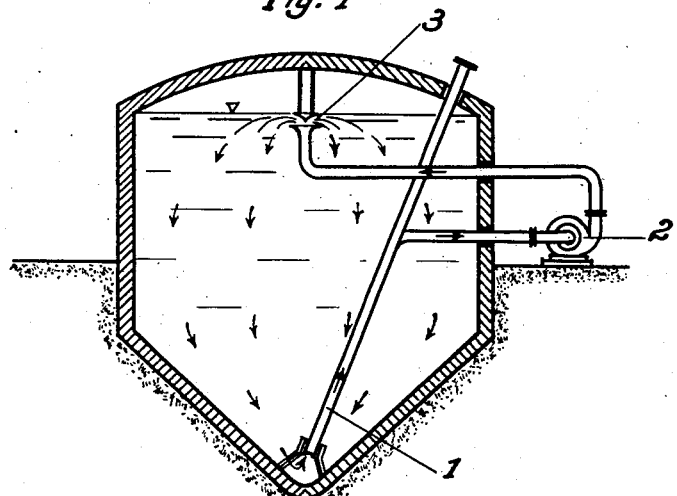
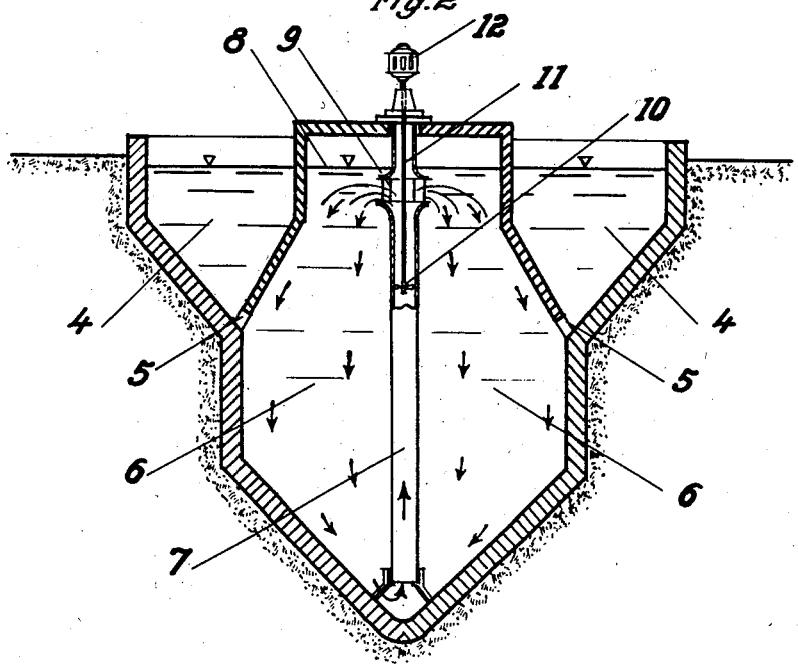

Patented July 30, 1929.

1,722,945

UNITED STATES PATENT OFFICE.

MAX PRÜSS, OF ESSEN, GERMANY.

METHOD OF ACCELERATING THE SLUDGE DIGESTION FOR SEWAGE TREATMENT.

Application filed June 18, 1927. Serial No. 199,787.

In a conventional digestion chamber at rest, the solid sludge parts sink to the bottom thereof and settle there more or less in layers according to their specific weight, while above the sludge the largest portion of the sludge water is collected. The decomposition of the organic sludge ingredients takes place by the activity of micro-organisms, first, by the solid organic matters being changed to compounds soluble in water and being dissolved in the small quantity of sludge water confined in the closely settled sludge and, then, by the bacteria taking-up said dissolved organic matters from the sludge water, the final decomposition of the organic matters into its elements taking place within the bacteria and the freed elements being used for the breathing and further growing of the bacteria. The non-useful matters are again secreted from the bacteria in gaseous condition or solution, together with a large quantity of carbon dioxide that is ejected from the bacteria, like from all organisms, as the final product of the breathing. The solubility of the sludge water for the secreted gases is increased with increasing depth of the sludge chamber and is with the normal depth of the latter of 10 meters about double as intense at the bottom as at the level thereof. The small quantities of sludge water confined in the closely settled sludge on the bottom of the sludge chamber, are therefore quickly saturated with carbon dioxide, so that the bacteria, when taking up fresh sludge water with further dissolved organic matters, absorb at the same time large quantities of carbon dioxide previously ejected therefrom. This is very injurious to the activity and capacity of the bacteria in the deeper sludge layers inasmuch as also large quantities of methane are secreted from the bacteria, of which the solubility in the sludge water is very weak and which as gas bubbles settle on the individual bacteria until at last the latter are completely shut-off from the surrounding sludge water by a gaseous zone so that a further nourishment of the bacteria is impossible. If, therefore, the full activity of the micro-organisms is to be permanently maintained also in the deeper sludge layers, care must be taken that the named digestion products injurious to the bacteria are continuously removed from the sludge. To this end, it has been proposed to employ agitators or to introduce gaseous or liquid matters into the bottom of the sludge chamber, the result being more or less satisfactory.

According to the present invention, for the purpose in question, the settled sludge parts with the sludge water confined therein is pumped or conveyed from time to time through a piping from the bottom of the sludge chamber to near the level thereof.

The accompanying drawing illustrates diagrammatically by way of example how the invention can be put into practice: Figs. 1 and 2 are vertical sections respectively through a digestion chamber, and through a two-storied settling and digestion tank (Imhoff tank), fitted with the improved arrangement.

Referring to Fig. 1: The inclined sludge pipe 1 extending down to the deepest point of the digestion chamber $x$, has a branch $1^a$ leading to a quickly acting pump 2, from which a pipe $2^a$ leads to just below the level of the contents in the digestion chamber and terminates at 3 directly below said level.

Referring to Fig. 2: The sludge from the settling basin 4 slips through the apertures 5 down into the digestion chamber 6. A vertical sludge pipe 7 extends from the deepest point to the top of the chamber 6 and has directly below the sludge level 8 apertures 9 therein, while a screw-propeller 10 on a spindle 11 in said pipe is set in quick rotation, for instance by means of an electromotor 12 external to the tank.

In both arrangements, the sludge with the sludge water confined therein can be pumped from the deepest point of the digestion chamber to its level, the arrows indicating the path taken by the travelling sludge.

The gas bubbles sticking to the individual bacteria and to the smallest sludge particles expand during their flow from the bottom to the level of the digestion chamber to about double their volume and are separated therefrom due to the rapid pumping action. The amount of carbon dioxide dissolved in the raised sludge water is, due to the decrease of the hydraulic pressure, reduced to about half of its volume and is further diminished by its being mixed with the large quantity of sludge water above the bottom sludge. The heavy sludge parts sink in the digestion chamber quicker than the sludge water pumped up therewith, so that they are separated from said sludge water that is highly saturated with dissolved matters. When settling again on the bottom, said sludge parts are surrounded by fresh sludge water whereby the sludge dilution is again enhanced. The rapid pumping of the sludge from the bottom to the level thus creates favourable conditions in the whole digestion chamber for the sludge dilution as well as for the succeeding gasification, which result in an essential increase of the gas quantities produced by a unit of the digestion chamber and of the sludge, and further in an essential shortening of the time required for the sludge decomposition; said acceleration of the sludge digestion being essentially higher than that attained by the hitherto used agitating and rinsing means.

It is, of course, not necessary to work the pump or propeller uninterruptedly, a continuously repeated working at intervals being sufficient for the purpose in question.

The improved arrangement affords further the possibility of removing the noxious floating sludge in a simple manner. By a reversal of the pump or propeller, the floating sludge can be drawn off from the sludge level, broken by the pump and forced into the bottom part of the digestion chamber, great portion of the floating sludge being there kept back by the settled sludge and decomposed with the latter, while those portions of the floating sludge returning again to the sludge level are quickly digested by their being already mixed with well digestible sinking sludge, so that they can be let off and dried.

It will be noted that in the present invention, the sewage is not aerated at any stage of the treatment herein described, and thereby the anaerobic bacteria are kept active.

What I claim, is:—

1. In a method of accelerating the digestion and fermentation of sewage sludge, the steps of holding the sludge in a closed container wherein the heavy parts of the sludge settle and in raising the sludge which has been deposited at the bottom of a sludge receptacle to close to but below the surface of the liquid therein, whereby such sludge by its specific gravity drops again to the bottom of the receptacle through the liquid therein, all without introducing air into the sewage at below the surface thereof.

2. In a method of accelerating the digestion and fermentation of sewage sludge, the step which consists in raising the sludge which has been deposited at the bottom of a closed sludge receptacle to close to but below the surface of the liquid therein in such a manner that the sludge so raised is free from contact with air or gases containing air, whereby such sludge by its specific gravity drops again to the bottom of the receptacle through the liquid therein.

3. In a method of accelerating the digestion and fermentation of sewage sludge, the step which consists in withdrawing the floating sludge from the vicinity of the surface of the liquid in the sludge receptacle, and forcing it into the sludge deposited on the bottom of such receptacle, all without introducing air into the sludge at below the surface thereof.

4. In a method of accelerating the digestion and fermentation of sewage sludge, the steps which consist in raising the sludge which has been deposited at the bottom of a sludge receptacle to near but below the surface of the liquid therein, whereby such sludge by its specific gravity drops again to the bottom of the receptacle through the liquid therein, and withdrawing the floating sludge from the vicinity of the surface of the liquid in the sludge receptacle, and forcing it into the sludge deposited on the bottom of such receptacle, all without introducing air into the sewage at below the surface thereof.

5. In a method of accelerating the digestion and fermentation of sewage sludge, the steps which consist in raising the sludge which has been deposited at the bottom of a sludge receptacle to the vicinity of the surface of the liquid therein but below such surface in such a manner that the sludge raised is free from contact with air or gases containing air, whereby such sludge by its specific gravity drops again to the bottom of the receptacle through the liquid therein, and withdrawing the floating sludge from the vicinity of the surface of the liquid in the sludge receptacle, and forcing it into the sludge deposited on the bottom of such receptacle.

6. A method of accelerating the digestion and fermentation of sewage sludge, the steps of holding sewage and sludge in a container as a deep body, wherein the heavy parts of the sludge settle to the lower part thereof, raising the said heavy parts of the sludge which have settled out, to close to but below the surface of the liquid therein, whereby gas held absorbed by the said heavy parts of the sludge can escape therefrom, and after which the heavy parts of the sludge can again settle out, all without introducing air into the sewage at below its surface.

7. A method of accelerating the digestion and fermentation of sewage sludge, the steps of holding sewage and sludge in a closed container as a deep body, wherein the heavy parts of the sludge settle to the lower part thereof, raising the said heavy parts of the sludge which have settled out, to close to the surface of the liquid therein, whereby gas held absorbed by the said heavy parts of the sludge can escape therefrom, and after which the heavy parts of the sludge can again settle out, all without introducing air into the sewage at below its surface.

In testimony whereof I have hereunto set my hand.

MAX PRÜSS.